United States Patent
von Vistauxx

(10) Patent No.: US 11,288,382 B2
(45) Date of Patent: *Mar. 29, 2022

(54) REMOVING INFORMATION FROM DATA

(71) Applicant: TFOR LLC, Reston, VA (US)

(72) Inventor: David von Vistauxx, Silver Spring, MD (US)

(73) Assignee: TFOR LLC, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/782,036

(22) Filed: Feb. 4, 2020

(65) Prior Publication Data

US 2020/0175182 A1    Jun. 4, 2020

Related U.S. Application Data

(63) Continuation of application No. 15/008,608, filed on Jan. 28, 2016, now Pat. No. 10,552,623.

(51) Int. Cl.
*G06F 21/60* (2013.01)
*G06F 21/62* (2013.01)

(52) U.S. Cl.
CPC ........... *G06F 21/604* (2013.01); *G06F 21/62* (2013.01); *G06F 2221/2141* (2013.01)

(58) Field of Classification Search
CPC ................ G06F 21/604; G06F 21/62; G06F 2221/2141; G06F 2221/2113
See application file for complete search history.

(56) References Cited

U.S. PATENT DOCUMENTS

| | | | | |
|---|---|---|---|---|
| 8,688,996 | B2* | 4/2014 | Livesey | H04L 9/0827 713/176 |
| 10,552,623 | B1* | 2/2020 | von Vistauxx | G06F 21/604 |
| 2002/0054679 | A1* | 5/2002 | Vesely | H04L 9/0662 380/46 |
| 2003/0039358 | A1* | 2/2003 | Scheidt | H04L 9/085 380/47 |
| 2003/0149869 | A1* | 8/2003 | Gleichauf | H04L 63/18 713/153 |
| 2004/0003262 | A1* | 1/2004 | England | G06F 21/72 713/189 |
| 2004/0107356 | A1* | 6/2004 | Shamoon | H04N 21/44204 713/193 |
| 2014/0047197 | A1* | 2/2014 | Kokrady | G11C 8/16 711/149 |
| 2015/0356299 | A1* | 12/2015 | Barkelew | G06F 21/575 713/2 |

* cited by examiner

*Primary Examiner* — Baotran N To
(74) *Attorney, Agent, or Firm* — Clyde R Christofferson, Esq.

(57) ABSTRACT

Non-informational data D is generated as an output using a non-informational data E and informational data as inputs to a function on a computing device in an information-restricted domain. The function may be an XOR and the non-informational data E may be a pseudorandom string of the same length as the informational data. The non-informational data D is moved to an unrestricted domain where it may be managed normally. When the informational data is needed it can be re-generated using the non-informational data D and non-informational data E as inputs to an inverse function (XOR is its own inverse). The non-informational data E may be generated from a smaller random seed.

20 Claims, 5 Drawing Sheets

REMOVING INFORMATION FROM DATA

BACKGROUND

Aspects of this disclosure are generally related to data storage, and more particularly to reversibly removing information from data. The widespread use of electronic data storage that can be accessed via a computer network has inherent vulnerabilities. Large corporations and government agencies have been the victims of embarrassing and costly data security breaches perpetrated via remote computers. A wide variety of techniques for protecting data and computer networks are known, including but not limited to firewalls, password protection and encryption. However, such techniques may need to be frequently updated in order to defend against newly developed attack techniques and newly discovered vulnerabilities. Moreover, such techniques do not guarantee security. For example, encrypted and password-protected data may be stolen in a protected form and security features subsequently defeated in an offline attack. Techniques for securing data and networks may also hinder data access and data management.

SUMMARY

All examples, aspects and features mentioned in this document can be combined in any technically possible way.

Some aspects of the invention may be predicated in-part on recognition that removal of sensitive information from data may cause that data to be easier to manage. For example, the domain in which informational data is stored may require certain types or levels of protection, and the users and devices which have access to that data may be restricted. By removing the information from the data the inversely proportional relationship between ease of use and security may become proportional. Consequently, data management practices may be less hindered by security concerns. Moreover, less reliance on security may be required. However none of these aspects should be viewed as limiting.

In accordance with an aspect, an apparatus comprises: a first information-restricted domain; a first unrestricted domain; a first computing device in the first unrestricted domain, the first computing device comprising a program on non-transitory memory and a processor that runs the program, the program comprising a first function that uses a non-informational data E and informational data as inputs to generate non-informational data as an output, the first computing device moving the non-informational data to the first unrestricted domain; a second computing device in the first information restricted domain, the second computing device managing storage of the non-informational data in the first information-restricted domain. In some implementations a size of the non-informational data E is equivalent to or greater than a size of the informational data. In some implementations the apparatus comprises a seed and a second function that generates the non-informational data E from a seed, wherein the seed is smaller than the non-informational data E and the non-informational data E comprises a pseudorandom string of bits. In some implementations the apparatus comprises a second information-restricted domain comprising a storage device on which the seed or non-informational data E is stored, and wherein the seed or non-informational data E is not maintained in the first unrestricted domain when not in use. In some implementations the apparatus comprises an inverse function that uses the non-informational data E and non-informational data D from the first information-restricted domain as inputs to re-generate the informational data as an output in the first unrestricted domain. In some implementations the apparatus comprises a second unrestricted domain comprising an inverse function that uses sets of non-informational data E and sets of non-informational data D as inputs to generate a transaction record. In some implementations the first function comprises an exclusive OR function. In some implementations the apparatus comprises program code that generates at least one masking non-informational data E from the non-informational data E, the masking non-informational data E comprising a subset of bits of the non-informational data E. In some implementations the apparatus comprises program code that triggers generation of a new non-informational data E and new non-informational data D, the new non-informational data E replacing the non-informational data E in storage and the new non-informational data D replacing the non-informational data D in storage. In some implementations the program code triggers generation of the new non-informational data E and the new non-informational data D in response to a write to the informational data.

In accordance with an aspect a method comprises: generating non-informational data D as an output in response to a non-informational data E and informational data as inputs with a first function on a computing device in a first information-restricted domain; moving the non-informational data D to a first unrestricted domain; managing storage of the non-informational data D in the first information-restricted domain with a second computing device. In some implementations the method comprises generating the non-informational data E with a size equivalent to or greater than a size of the informational data. In some implementations the method comprises generating the non-informational data E from a seed using a second function, wherein the seed is smaller than the non-informational data E and the non-informational data E comprises a pseudorandom string of bits. In some implementations the method comprises storing the seed or non-informational data E on a storage device in a second information-restricted domain, and flushing the seed or non-informational data E from the first unrestricted domain when the seed or non-informational data E is not in use. In some implementations the method comprises re-generating the informational data as an output in the first unrestricted domain using an inverse function that uses the non-informational data E and non-informational data D from the first information-restricted domain as inputs. In some implementations the method comprises generating a transaction record comprising sets of informational data using sets of non-informational data E and sets of non-informational data D as inputs to an inverse function. In some implementations the method comprises using an exclusive OR function as the first function. In some implementations the method comprises generating at least one masking non-informational data E from the non-informational data E, the masking non-informational data E comprising a subset of bits of the non-informational data E. In some implementations the method comprises triggering generation of a new non-informational data E and new non-informational data, the new non-informational data E replacing the non-informational data E in storage and the new non-informational data D replacing the non-informational data D in storage. In some implementations the method comprises triggering generation of the new non-informational data E and the new non-informational data D in response to a write to the informational data.

DETAILED DESCRIPTION

Some aspects, features and implementations may comprise computer components and computer-implemented steps or processes that will be apparent to those of ordinary skill in the art. It should be understood by those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of physical processor devices. For ease of exposition, not every step, process or element is described herein as part of a computer system. However, those of ordinary skill in the art will recognize steps, processes and elements that may have a corresponding computer system or software component. Such computer system and software components are therefore enabled by describing their corresponding steps, processes or elements, and are within the scope of the disclosure.

Figure 1:
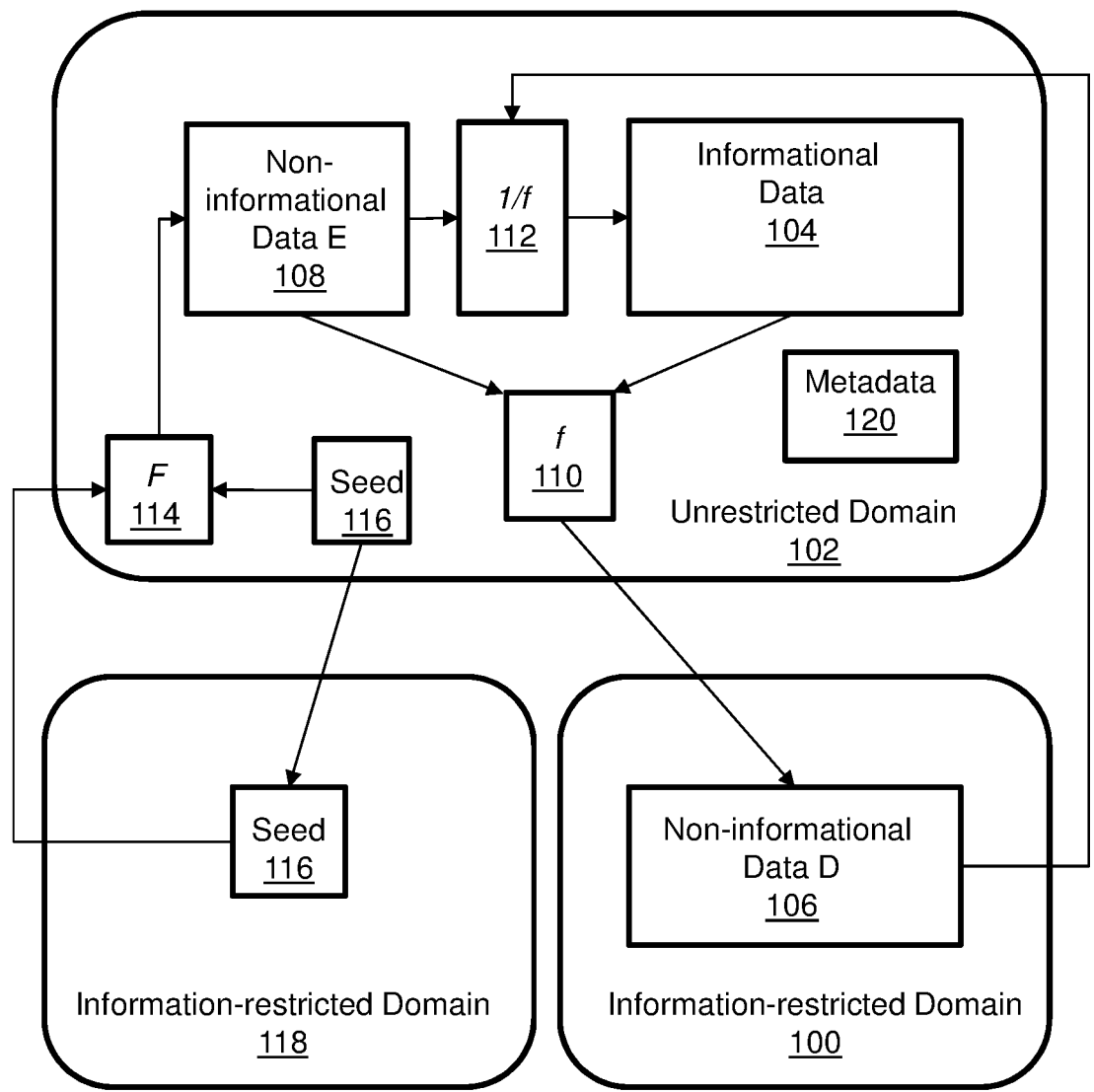
FIG. 1 is a block diagram illustrating reversible removal of information from data and subsequent regeneration of that information.

FIG. 1 is a block diagram illustrating reversible removal of information from data, and subsequent regeneration of that information. The illustrated example includes at least one information-restricted domain 100 and at least one unrestricted domain 102. A domain may be associated with any of a variety of things including but not limited to a network or computer security domain, country, state, geographical territory, geographical location, business entity, network, network node, data center, application, computing device, server, server cluster, data storage device, pool of data storage devices and data storage array. The unrestricted domain 102 is a domain in which informational data 104 is permitted to be present. Informational data is data that contains information that can be understood or used by a person, device or computer program. For example, informational data could be a digital representation of sensitive information such as a name of a person and some of their personal information such as home address, social security number and credit card numbers, for example and without limitation. Non-informational data D 106 is data that does not contain information that can be understood or used by a person, device or computer program. For example and without limitation, non-informational data D may be a random string of bits or numbers. Non-informational data E 108 is data that is non-informational with respect to informational data 104, e.g. and without limitation a random string of bits or numbers, an audio file, a text file or some other data that might be understood or used by a person, device or computer program but which is non-informational with respect to informational data 104. Within the unrestricted domain 102, informational data 104 and non-informational data E 108 are used as inputs by a function 110 to generate the corresponding non-informational data D 106. In other words, the function 110 removes the information from the informational data. The resulting non-informational data D 106 may then be moved to the information-restricted domain 100, e.g. the informational data 104 is not necessarily stored in the unrestricted domain when not in use. Because the data being moved is non-informational it may be maintained without at least some of the cumbersome data management and security techniques that are applied to informational data.

The informational data 104 can be retrieved by using an inverse function 112 in an unrestricted domain such as the unrestricted domain 102, a permitted domain or authorized domain. When the informational data is needed, the non-informational data D 106 may be copied from the information-restricted domain 100 to an unrestricted domain 102. The non-informational data D 106 and the non-informational data E 108 are provided as inputs to an inverse function 112 (inverse of function 110) to regenerate the informational data 104. Those of ordinary skill in the art will understand that certain functions may utilize a first non-informational data E for generating the non-informational data D and a different second non-informational data E for regenerating the informational data from the non-informational data D. Whichever type of function is used, the non-informational data E for regenerating the informational data and the corresponding non-informational data D are never simultaneously present in the same information-restricted domain, nor is it required that either non-informational data E or non-informational data D ever be present in any unrestricted domain (in a non-limiting contextual example, non-informational data D may be maintained in information restricted domain 100 and non-informational data E may be maintained in information restricted domain 118, preventing subjecting the information to the laws of any jurisdiction), at least in some implementations.

A wide variety of functions may be used as the function 110 to generate the non-informational data D from the informational data. In one example the information removal function 110 is an XOR (exclusive OR) function. The XOR function outputs a logical "1" only when the inputs differ, e.g. (non-informational data E, informational data) inputs of (1,0) or (0,1). Thus, the bits of the non-informational data E may be XORed with the bits of the informational data to generate the non-informational data. The XOR function is its own inverse function 112.

In some implementations the non-informational data E 108 is a pseudorandom value of the same or greater size as the informational data 104. For example, the non-informational data E may be a pseudorandom string of bits that is generated by a DRBG (deterministic random bit generator) function 114 from a DRBG seed value 116 that may be the same size as, larger than, or smaller than the non-informational data E, and smaller than the informational data. The seed 116 may be a random value, although that should not be viewed as a limitation. A given seed will generate the same non-informational data E each time the DRBG function is invoked, and different seeds will generate different non-informational data E. Because the DRBG seed 116 can be smaller than the informational data and/or non-informational data E 108 it is possible to reduce incurred storage cost. Moreover, the non-informational data E may be generated and used on-the-fly so that it is not necessary to have the entire non-informational data E instantiated at any given time. The seed 116 may be maintained in storage in the unrestricted domain 102 or moved to an information-restricted domain 118 and used as needed to regenerate the non-informational data E 108 using the DRBG function 114. In some implementations the seed is maintained in a different information-restricted domain than the information-restricted domain in which the non-informational data D is stored. Non-informational data E may be shared, e.g. and without limitation by maintaining separate copies (or the ability to generate copies) in different domains. Metadata 120 that associates a particular seed with particular corresponding non-informational data D may be maintained in the unrestricted domain.

In some implementations the non-informational data E is arbitrary but meaningful digital data such as data from video files, audio files, text files, data pulled from an arbitrary website anywhere on the web, or some other data that while meaningful in some aspect is still arbitrary and non-informational with respect to the informational data 104. Whatever data is used as a source for non-informational data E may optionally be used with an offset starting point, multiple offsets, or any of a wide variety of techniques that might randomize the data selected therefrom as non-informational data E.

Figure 2:
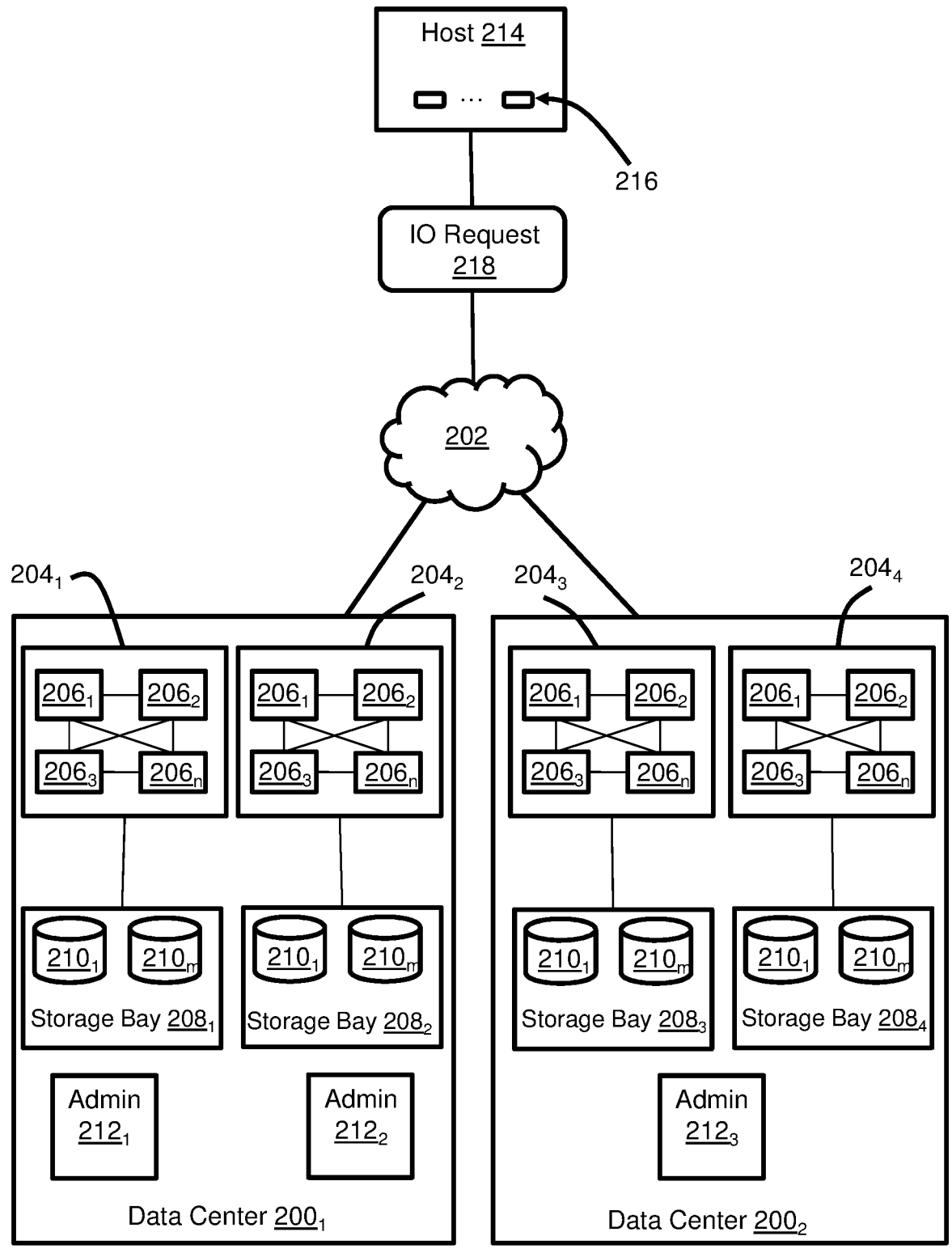
FIG. 2 illustrates a distributed data storage system in which reversible removal of information from data may be implemented.

FIG. 2 illustrates a distributed data storage system in which reversible removal of information from data may be implemented. The distributed data storage system includes multiple individual data storage systems. Each individual data storage system may include a cluster, data center or storage array, each having its own security infrastructure for example and without limitation. For context and without limitation, the illustrated distributed data storage system includes data centers $200_1$, $200_2$ that are interconnected via a network 202. For context and without limitation the network 202 could be a WAN (wide area network) or MAN (metropolitan area network). The data centers $200_1$, $200_2$ include clusters $204_1$, $204_2$, $204_3$, $204_4$ of computing nodes $206_1$-$206_n$ and associated storage bays $208_1$, $208_2$, $208_3$, $208_4$, respectively. The computing nodes may include specialized storage engine hardware platforms or "vanilla" storage servers, for example and without limitation. The storage bays may include storage devices $210_1$ through $210_m$ of various different technology types, e.g. and without limitation flash drives, 15 k disk drives and 7 k disk drives, tape drives and all historical and future storage mediums. Within each cluster, each storage engine is connected to every other storage engine via point-to-point links of an interconnecting fabric. For context and without limitation, data center $200_1$ is associated with two administration workstations $212_1$, $212_2$ and data center $100_2$ is associated with one administration workstation $212_3$. For context and without limitation data centers $200_1$ and $200_2$ can be located in separate jurisdictions or locations anywhere in the world subject only to the limitation that they are accessible via network 202.

A host device 214 utilizes the storage resources of the distributed data storage system. For example, the host device hosts instances of applications 216 that utilize data stored by the data centers $200_1$, $200_2$. IOs such as read and write operations are implemented by sending an TO request 218 from the host to one of the data centers. The TO request is processed by one or more computing nodes of the clusters. The computing nodes interface with the storage devices of the storage bays. For example, requested data may be copied from the storage bay into the memory of a computing node and then provided to the host. A write operation may including copying data from the host into the memory of a computing node and subsequently de-staging that data to the storage bay. The computing nodes provide an abstraction layer between the storage devices and the host. For example, the computing nodes may present logical volumes that are backed by the storage devices of the storage bays.

In one implementation the host 214 or a hosted application 216 or other application is an unrestricted domain and the data centers $200_1$, $200_2$ are information-restricted domains. The host 214 or hosted application or other application maintains the information removal function and inverse function for removing information from data and regenerating that information, respectively. The non-informational data D and corresponding seed or non-informational data E may be distributed in a wide variety of ways. For example, the non-informational data D may be maintained in data center $200_1$ while the seed or non-informational data E is maintained in data center $200_2$ or host 214. Because the data centers maintain only non-informational data in some implementations the administration stations are able to perform normal maintenance operations, e.g. as if there is no sensitive information in storage. In another example the non-informational data D is maintained by cluster $204_1$ using storage bay $208_1$ while the seed or non-informational data E is maintained by storage bay $208_2$, in which case cluster $204_1$ and storage bay $208_1$ are considered as one information-restricted domain and cluster $204_2$ and storage bay $208_2$ are considered as another information-restricted domain. The two information-restricted domains could be managed by administration stations $212_1$ and $212_2$ respectively with normal maintenance operations and procedures where station $212_1$ is restricted to cluster $204_1$ and storage bay $208_1$ and station $212_2$ is restricted to cluster $204_2$ and storage bay $208_2$.

In at least one implementation one or more of the administration stations or applications thereon could be an unrestricted domain. The information removal function and inverse function could be implemented by the one or more administration stations or applications. For example, restoration of the informational data could be limited to a particular administration workstation or application. The seed or non-informational data E could be known or unknown to a user, or generated on-the-fly before putting it into a different domain or jurisdictional environment visible to the end user or application, such as in a one-time-use scenario, and the on-the-fly seed and/or data could be overwritten as it is read. The seed or non-informational data E could be available to the administration station or application but unknown to the user, or known to the user and maintained by the administration station or application only when necessary, e.g. inputted by the user and deleted from the administration station or application when not in use. Such techniques are not limited to use with administration stations.

Various procedures associated with data storage and security may be used in conjunction with the concepts described herein. For example and without limitation, encryption and compression, either alone or in combination, may be implemented on one or more of the informational data, non-informational data, non-informational data E, seed and combinations thereof. Encryption and compression techniques are well understood by those of ordinary skill in the art.

Figure 3:
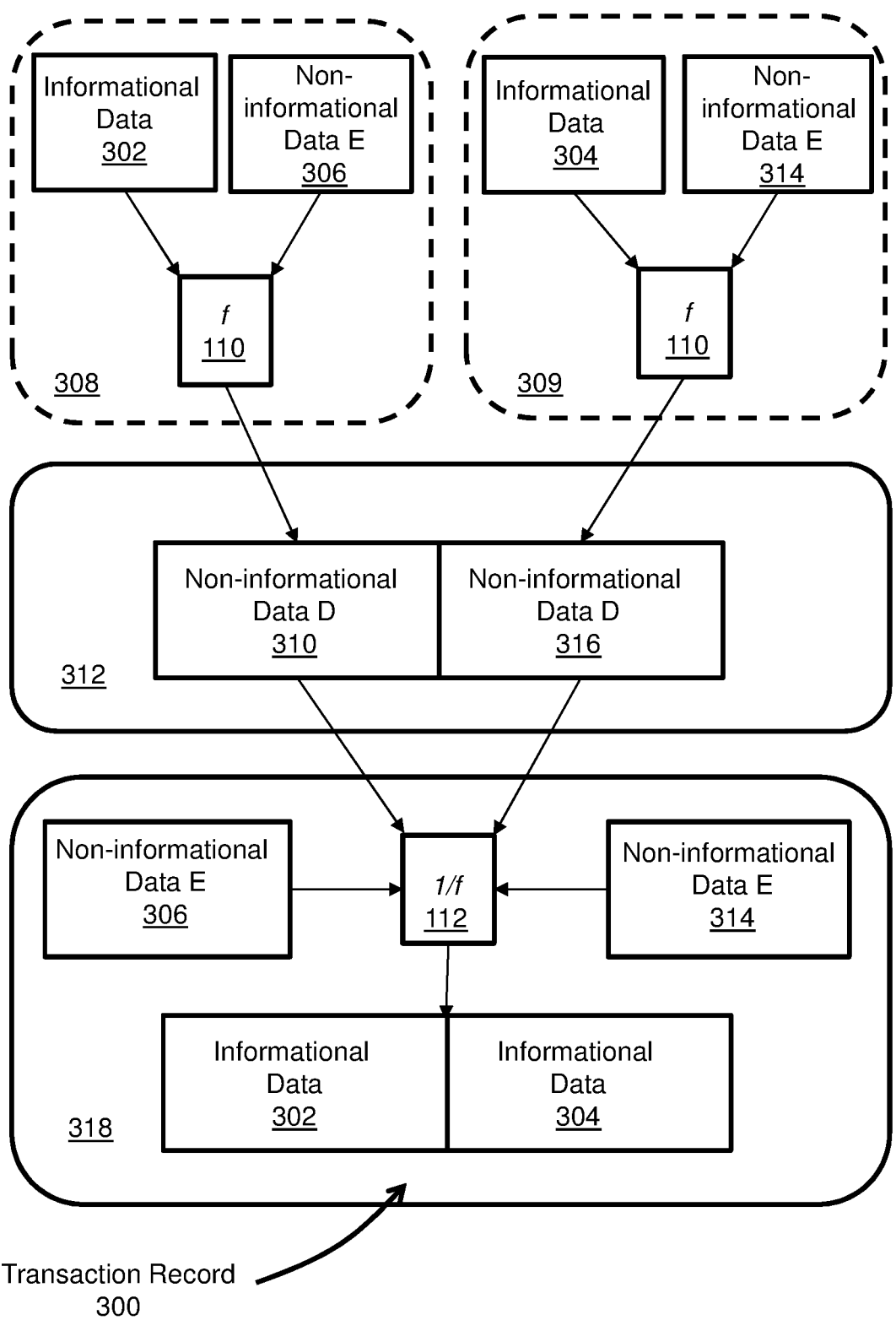
FIG. 3 illustrates generation of an informational transaction record.

Referring now to FIG. 3, an informational transaction record 300 may be generated by combining multiple sets of informational data 302, 304. The first set of informational data 302 and a first non-informational data E 306 are used as inputs to function 110 in unrestricted domain 308 to generate a first set of non-informational data D 310 that is moved to an information-restricted domain 312. The second set of informational data 304 and a second non-informational data E 314 are used to generate a second set of non-informational data D 316 that is moved from unrestricted domain 309 to information-restricted domain 312. The first and second sets of non-informational data D 310, 316 may then be associated or combined and stored in the information-restricted domain 312. The informational transaction record 300 may be recovered in a second unrestricted domain 318 by retrieving the first and second sets of non-informational data D 310, 316 and inputting them to the inverse function 112 along with copies of the non-informational data Es 306, 314.

Figure 4:
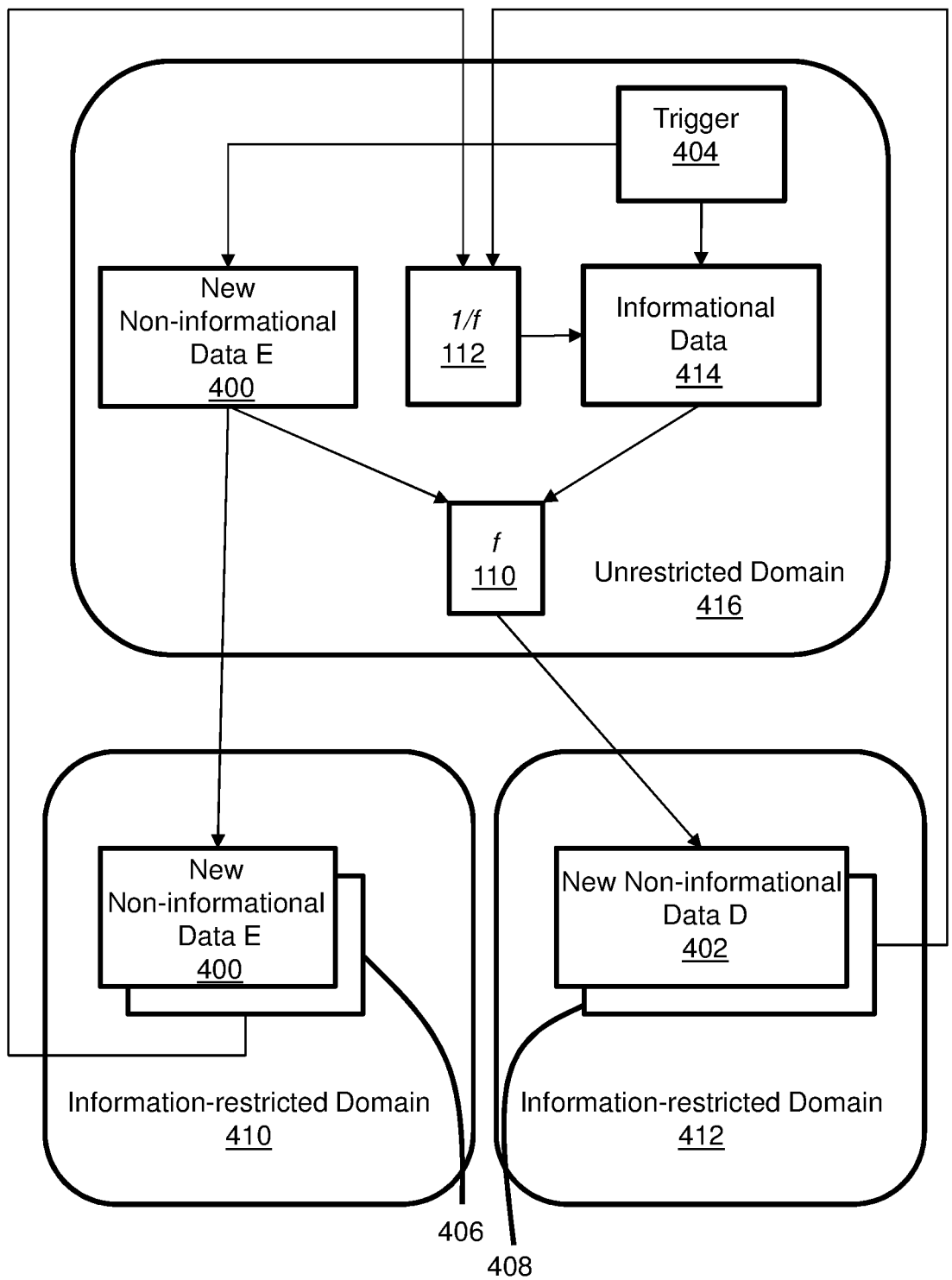
FIG. 4 illustrates generation of a new non-informational data D set in response to a condition such as a write operation.

Referring now to FIG. 4, new non-informational data E 400 and new non-informational data D 402 may be generated in response to a trigger condition 404 such as a write operation. In the illustrated example non-informational data E 406 and corresponding non-informational data D 408 are retrieved from respective information-restricted domains 410, 412 in order to regenerate informational data 414 for use in an unrestricted domain 416. A trigger 404 such as a write operation is processed in the unrestricted domain 416 as part of that use. The write operation changes at least some of the informational data 414. The write operation also prompts generation of a new non-informational data E 400. The new non-informational data E and post-write informational data are inputted to the information removal function 110 to generate new non-informational data D 402. The new non-informational data E 400 may be moved to information-restricted domain 410, e.g. overwriting the previous non-informational data E 406. The new non-informational data D 402 may be moved to information-restricted domain 412, e.g. overwriting the previous non-informational data D 408. The procedure may be repeated on each occurrence of trigger 404, such as a new write, when use of the informational data in the unrestricted domain is completed, when the informational data is being moved to the information restricted domain, e.g. after multiple writes, or based on some other condition or prompt for example and without limitation.

Figure 5:
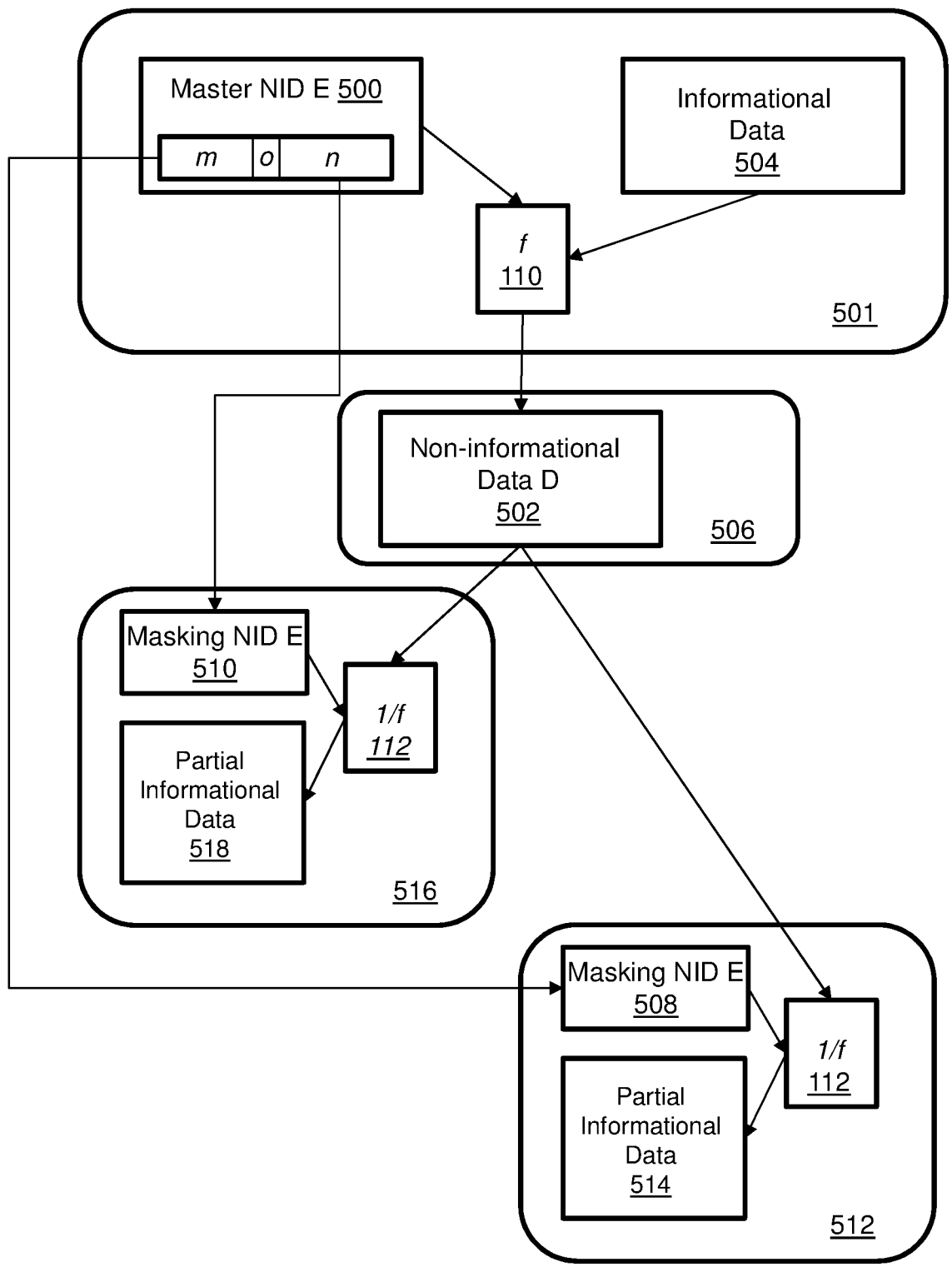
FIG. 5 illustrates generation and use of masking non-informational data E.

Referring to FIG. 5, one or more masking non-informational data Es may be generated from a master non-informational data E. A master non-informational data E 500 is non-informational data E used in unrestricted domain 501 to generate non-informational data D 502 from informational data 504 using a function 110 as described above. The non-informational data D may then be moved to an information-restricted domain 506. A masking non-informational data E is a portion of the master non-informational data E. In a simple example a first masking non-informational data E 508 contains the first m bits of the master non-informational data E 500 and a second masking non-informational data E 510 contains the last n bits of the master non-informational data E 500. In an unrestricted domain 512 the first masking non-informational data E 508 and non-informational data D 502 may be inputted to the inverse function 112 to generate a first partial informational data set 514. More particularly, the first masking non-informational data E 508 generates a first partial informational data set 514 that contains the first m bits of informational data while the remaining bits are non-informational. In another unrestricted domain 516 the second masking non-informational data E 510 and non-informational data D 502 may be inputted to the inverse function 112 to generate a second partial informational data set 518. More particularly, the second masking non-informational data E 510 generates a second partial informational data set that contains the last n bits of informational data while the remaining bits are non-informational. A set of o bits of the informational data 504 can only be obtained using the master non-informational data E 500 which includes bits corresponding to the m, o and n bits of the informational data. Thus, portions of the informational data 504 can be masked from different selected users or devices or applications. In a non-limiting contextual example, for an eyes only informational document stored on a retrieval medium, a masking non-informational data E redaction key could redact the document to Top Secret, and a different masking non-informational data E redaction key could redact the document to Secret, and another masking non-informational data E redaction key could redact the document to Confidential. The use of multiple masking non-informational data E redaction keys enables function although only one copy of the document needs to be maintained, thereby facilitating strict access control, although multiple copies could be stored. Non-informational data E masks may also be layered, e.g. any number of masks may be required in combination to regenerate a document in whole or in part. Those of ordinary skill in the art will recognize that this and other features described above may be used in a variety of combinations. It should be noted that either non-informational data E or non-informational data D or both can be masked by this technique. When masked non-informational data E is combined using the inverse function with masked non-informational data D the result is only information permitted by masked non-informational data E and permitted by masked non-informational data D are present in the result.

A tracking key may be maintained in the non-informational data E so that when the information is extracted the document copy (or data record) can uniquely determine which tracking key was used and therefore who/what machine/application/etc. regenerated the information from the non-informational data.

In some implementations there are features that restrict re-generation of the informational data to a particular domain. For example, preventing non-informational data E, non-informational data D or a mask from being present outside a domain will tend to restrict re-generation of some or all of the informational data to that domain. This may be accomplished in a wide variety of different ways such as, for example and without limitation, associating the non-informational data E, non-informational data D, mask, or any combination thereof with domain hardware. In one example the non-informational data E, non-informational data D or mask could be the MAC address (or some variation thereof) of a workstation that is the domain. User or group specific encoding of non-informational data E and non-informational data D could also be implemented. Avoidance of transmission of informational data outside of a particular domain may help to enhance security.

Further implementations of masks, of which there exists a wide variety, may be described. Informational data and non-informational data E are inputted to a function (XOR) to generate non-informational data D. Either or both of non-informational data E and non-informational data D can be modified by the same mask or different masks. For example, non-informational data E can be modified by a mask to generate non-informational data E', and non-informational data D can be modified by an identical mask to generate non-informational data D'. Non-informational data D' XORed with non-informational data E yields partial informational data, which includes the original informational data with the masked portion unintelligible. Non-informational data E' XORed with non-informational data D yields partial informational data, which includes the original informational data with the masked portion unintelligible.

Where the masks are different, non-informational data E' can be XORed with non-informational data D' to yield partial informational data including the original informational data with both masked portions unintelligible. Further, non-informational data D' and non-informational data E' could reverse each other or make information intelligible when using both primes, e.g. for that mask portion where they implement reversing masks. It is also possible to multiple mask, e.g. mask non-informational data D' to generate non-informational data D" and mask non-informational data E' to generate non-informational data E". In context and without limitation, a POS (point of sale) machine could have an arbitrary string D associated with it. The POS machine could XOR the transaction information with the D string and XOR that result with a transaction number (optionally repeated) yielding non-informational data E" that when transmitted to some central site could be XORed with the non-informational data E string and then XORed with the transaction number (e.g. uniquely predictable at the receiving site) to capture the original information, although no information is transmitted, and the same data if resent would have a different E" representation. Steps or procedures can thus be cumulative. Non-informational data E can be generated as a pseudo random string, masked with a unique user mask, the result masked with a unique workstation mask, password protected, and encrypted. The result can only be used to regenerate the original information by a person with the correct password, logged in under the correct user, at the correct workstation with access to non-informational data D. Thus, individual components are transmittable without information and the information never exists until it is regenerated at the workstation.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a first unrestricted domain;
    a first computing device in the first unrestricted domain, the first computing device comprising a program on non-transitory memory and a processor that runs the program, the program comprising a first function that uses a non-informational data E and informational data as inputs to generate non-informational data D as an output, the first computing device moving the non-informational data D to storage in a first information-restricted domain and retaining in said unrestricted domain a location of said storage;
    wherein storage of the non-informational data D in the first information-restricted domain is managed with a second computing device
    wherein the non-informational data E is usable for regenerating said informational data from the non-informational data D retrieved from the first information-restricted domain by said first computing device using said storage location, and
    wherein the non-informational data E and the non-informational data D are never simultaneously present in the first information-restricted domain.

2. The apparatus of claim 1 wherein a size of the non-informational data E is equivalent to or greater than a size of the informational data.

3. The apparatus of claim 2 comprising a seed and a second function that generates the non-informational data E from the seed, wherein the seed is smaller than the non-informational data E and the non-informational data E comprises a pseudorandom string of bits.

4. The apparatus of claim 3 comprising a second information-restricted domain comprising a storage device on which the seed is stored, and wherein the seed is not maintained in the first unrestricted domain when not in use.

5. The apparatus of claim 1 comprising an inverse function that uses the non-informational data E and non-informational data D from the first information-restricted domain as inputs to re-generate the informational data as an output in the first unrestricted domain.

6. The apparatus of claim 1 comprising a second unrestricted domain comprising an inverse function that uses sets of non-informational data E and sets of non-informational data D as inputs to generate a transaction record.

7. The apparatus of claim 1 wherein the first function comprises an exclusive OR function.

8. The apparatus of claim 1 comprising program code that generates at least one masking non-informational data E from the non-informational data E, the masking non-informational data E comprising a subset of bits of the non-informational data E.

9. The apparatus of claim 1 comprising program code that triggers generation of a new non-informational data E and new non-informational data D, the new non-informational data E replacing the non-informational data E in storage and the new non-informational data D replacing the non-informational data D in storage.

10. The apparatus of claim 9 wherein the program code triggers generation of the new non-informational data E and the new non-informational data D in response to a write to the informational data.

11. A method comprising:
    generating non-informational data D as an output in response to non-informational data E and informational data as inputs with a first function on a computing device in a first unrestricted domain;
    moving the non-informational data D to storage in a first information-restricted domain and retaining in said unrestricted domain a location of said storage;
    wherein storage of the non-informational data D in the first information-restricted domain is managed with a second computing device,
    wherein the non-informational data E is usable for regenerating said informational data from the non-informational data D retrieved from the first information-restricted domain by said first computing device using said storage location, and
    wherein the non-informational data E and the non-informational data D are never simultaneously present in the first information-restricted domain.

12. The method of claim 11 comprising generating the non-informational data E with a size equivalent to or greater than a size of the informational data.

13. The method of claim 12 comprising generating the non-informational data E from a seed using a second function, wherein the seed is smaller than the non-informational data E and the non-informational data E comprises a pseudorandom string of bits.

14. The method of claim 13 comprising storing the seed on a storage device in a second information-restricted domain, and flushing the seed from the first unrestricted domain when the seed is not in use.

15. The method of claim 11 comprising re-generating the informational data as an output in the first unrestricted domain using an inverse function that uses the non-informational data E and non-informational data D from the first information-restricted domain as inputs.

16. The method of claim 11 comprising generating a transaction record comprising sets of informational data using sets of non-informational data E and sets of non-informational data D as inputs to an inverse function.

17. The method of claim 11 comprising using an exclusive OR function as the first function.

18. The method of claim 11 comprising generating at least one masking non-informational data E from the non-informational data E, the masking non-informational data E comprising a subset of bits of the non-informational data E.

19. The method of claim 11 triggering generation of a new non-informational data E and new non-informational data D, the new non-informational data E replacing the non-informational data E in storage and the new non-informational data D replacing the non-informational data D in storage.

20. The method of claim 19 comprising triggering generation of the new non-informational data E and the new non-informational data D in response to a write to the informational data.

\* \* \* \* \*